US009037110B2

(12) United States Patent
Smith et al.

(10) Patent No.: US 9,037,110 B2
(45) Date of Patent: *May 19, 2015

(54) SYSTEM AND METHOD FOR AUTHORIZING AND MONETIZING A TELEPHONE CALL

(71) Applicant: Securus Technologies, Inc., Dallas, TX (US)

(72) Inventors: Mark R. Smith, Coral Springs, FL (US); Jeremy R. Martin, Boca Raton, FL (US); Michael J. FitzGibbon, Delray Beach, FL (US); Matthew Joseph Simons, Canton, MI (US); John L. Duffy, Delray Beach, FL (US)

(73) Assignee: Securus Technologies, Inc., Dallas, TX (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/090,527

(22) Filed: Nov. 26, 2013

(65) Prior Publication Data

US 2014/0080443 A1    Mar. 20, 2014

Related U.S. Application Data

(60) Continuation of application No. 13/449,308, filed on Apr. 17, 2012, now Pat. No. 8,626,118, which is a division of application No. 12/103,138, filed on Apr. 15, 2008, now Pat. No. 8,190,121.

(60) Provisional application No. 60/935,634, filed on Aug. 23, 2007.

(51) Int. Cl.
*H04M 15/00*    (2006.01)
*H04M 15/08*    (2006.01)
*H04W 4/24*    (2009.01)

(52) U.S. Cl.
CPC .............. *H04M 15/08* (2013.01); *H04M 15/00* (2013.01); *H04M 2215/62* (2013.01); *H04W 4/24* (2013.01); *H04M 15/54* (2013.01)

(58) Field of Classification Search
CPC . H04M 15/08; H04M 15/00; H04M 2215/32; H04M 15/54; H04M 2215/62; H04M 17/00; H04W 4/24
USPC .............. 455/406, 408, 466, 445, 459, 456.1, 455/461, 415, 554.1; 370/265; 379/111, 379/243, 442, 211.01; 380/257, 41, 266; 713/153
See application file for complete search history.

(56) References Cited

U.S. PATENT DOCUMENTS 5,835,573 A    11/1998  Dee et al.
6,088,584 A    7/2000   Lundborg
(Continued)

OTHER PUBLICATIONS

Original Ex Parte Reexam Request [US819012 USPTO Reexamination Control No. 90/012,802] Mar. 1, 2013.
(Continued)

*Primary Examiner* — Mahendra Patel
(74) *Attorney, Agent, or Firm* — Zimmerman Intellectual Property Services LLC (57) ABSTRACT

A system and method of authorizing and monetizing a telephone communication such as a voice call is disclosed. The calling party may be in a controlled environment such as a prison or hospital; the called party is using a mobile telephone device. The call is facilitated by a service provider such as a connect service provider. The call is monetized by a message service charge billed to an account associated with the mobile telephone device. The call is facilitated as a voice call if there is authorization both for a charge for message service to the mobile telephone device and for the call from the calling party. The system is implemented with a system may use a message service communication protocol for the message and billing charge. computer-based system in operation with the interactive voice response system. Revenue from monetization of the call may be shared between service providers.

71 Claims, 4 Drawing Sheets

(56) References Cited

U.S. PATENT DOCUMENTS

| | | | |
|---|---|---|---|
| 6,115,461 A | 9/2000 | Baiyor et al. | |
| 6,397,055 B1* | 5/2002 | McHenry et al. | 455/408 |
| 7,042,992 B1 | 5/2006 | Falcone et al. | |
| 8,190,121 B2 | 5/2012 | Smith et al. | |
| 8,626,118 B2 | 1/2014 | Smith et al. | |
| 2002/0183040 A1* | 12/2002 | Lundstrom et al. | 455/406 |
| 2002/0199203 A1 | 12/2002 | Duffy et al. | |
| 2003/0027555 A1* | 2/2003 | Malackowski et al. | 455/414 |
| 2003/0162526 A1 | 8/2003 | Ogman et al. | |
| 2004/0058667 A1* | 3/2004 | Pienmaki et al. | 455/405 |
| 2004/0102180 A1 | 5/2004 | Olah | |
| 2005/0078808 A1 | 4/2005 | Winstead et al. | |
| 2005/0222913 A1* | 10/2005 | Eisenberg | 705/26 |
| 2006/0098796 A1* | 5/2006 | Link | 379/114.21 |
| 2006/0121881 A1 | 6/2006 | Lee | |
| 2006/0149644 A1* | 7/2006 | Sulmar et al. | 705/34 |
| 2007/0162553 A1* | 7/2007 | Dewing et al. | 709/207 |
| 2008/0220739 A1* | 9/2008 | Muoio et al. | 455/406 |
| 2009/0042539 A1 | 2/2009 | Jiang et al. | |
| 2011/0092183 A1* | 4/2011 | Wieczorek | 455/406 |

OTHER PUBLICATIONS

Information Disclosure Statement (IDS) Form (SB08) [US819012 USPTO Reexamination Control No. 90/012,802] Mar. 1, 2013.

Determination—Reexam Ordered [US819012 USPTO Reexamination Control No. 90/012,802] Mar. 15, 2013.

Reexam—Non-Final Action [US819012 USPTO Reexamination Control No. 90/012,802] Jun. 17, 2013.

Applicant Arguments—Remarks Made in an Amendment and Claims [US819012 USPTO Reexamination Control No. 90/012,802] Aug. 17, 2013.

Affidavit—submitted prior to Mar. 15, 2013 [US819012 USPTO Reexamination Control No. 90/012,802] Aug. 17, 2013.

Notice of Allowance and Issue Fee Due [U.S. Appl. No. 13/449,308 (division of application issued as U.S. Patent No. 8,190,121)] Nov. 14, 2013.

Communication and Interview Summary [U.S. Appl. No. 13/449,308 (division of application issued as U.S. Patent No. 8,190,121)] Nov. 6, 2013.

Amendment/Remarks [U.S. Appl. No. 13/449,308 (division of application issued as U.S. Patent No. 8,190,121)] Dec. 17, 2012.

Non-Final Action [U.S. Appl. No. 13/449,308 (division of application issued as U.S. Patent No. 8,190,121)] Jul. 16, 2012.

Notice of Intent to Issue Ex Parte Reexamination Certificate [US819012 USPTO Reexamination Control No. 90/012,802] Feb. 25, 2014.

Applicant Arguments—(Amended) Remarks Made in an Amendment and Claims [US819012 USPTO Reexamination Control No. 90/012,802] Dec. 19, 2013.

* cited by examiner

SYSTEM AND METHOD FOR AUTHORIZING AND MONETIZING A TELEPHONE CALL

This is a continuation application based upon and claiming the benefit of priority of and incorporating by reference in full the following U.S. patent applications: Ser. No. 13/449,308, filed Apr. 17, 2012, now U.S. Pat. No. 8,626,118, which is a division of Ser. No. 12/103,138, filed Apr. 15, 2008, now U.S. Pat. No. 8,190,121, which claims priority to Ser. No. 60/935,634, filed Aug. 23, 2007.

FIELD

The present invention relates to a method, a system and programming instructions stored on computer readable medium for authorizing and monetizing collect cellular telephone calls.

BACKGROUND

In some situations, a calling party cannot easily establish a telephone telecommunications link with another called party. This is particularly true when the calling party is in a physically restricted environment such as a prison, hospital or other controlled facility. In this situation, the calling party must use a specially configured telephone which accesses an operator service provider (OSP) and that OSP then assists the calling party to reach the called party. In these situations, the called party's telephone must accept collect calls. In the absence of the collect call acceptance by the called party, the telephone telecommunications link is not established and the calling party is blocked from communicating over the telephone due to actions by the OSP (electronic denial of service).

OBJECTS

It is an object of the present invention to provide a system and a method for authorizing and monetizing collect cellular telephone calls.

It is a further object of the present invention to provide a system and a method wherein authorization requires a positive response, either a positive voice response or a positive touch tone response or a positive text message response, from the called party in possession of an identifiable cellular telephone.

It is a further object of the present invention to provide both internal and external databases with a white list or approved cellular phone list, capable of accepting cellular collect calls, and a black list or "service denied" list containing cellular telephone numbers which are blocked due to various considerations.

It is an additional object of the present invention to provide inspirational information to the called party as part of the collect cellular telephone call.

SUMMARY

The method of authorizing and monetizing a cellular collect call requires identifying the cellular telephone carrier associated with an identified cellular telephone having a certain telephone number. After determining whether the carrier and the cellular telephone is enabled to accept a message service charge (premium SMS), a voice response module is activated seeking a positive authorization from the called party in possession of the cellular telephone. If the carrier and the telephone is enabled and a positive response is obtained from the called party on the identified cellular telephone, the system facilitates a connection between the calling party and the called party and initiates a predetermined billing charge assigned to the cellular telephone number. If the carrier or the cell phone is not enabled or if no authorization is obtained from the called party, the system facilitates a denial of completion of the collect cellular telephone call (a refusal to connect the caller and the called party). A timing function is often activated upon facilitating the connection between the calling party and the called party. In order to determine whether a collect cellular telephone call will be accepted by an identified cellular telephone, databases are accessed and one of these databases includes prior billing records of cellular telephone numbers. The designated database has an approved list of cellular telephone numbers (a white list) and a denied-service list of cellular telephone numbers (a black list). In the denied-service list, the designated database typically includes an indicator referencing prior charge backs for the assigned cellular telephone number.

DESCRIPTION

The present invention relates to a system, a method and programming instructions stored on computer readable medium for authorizing and monetizing collect cellular telephone calls. Similar numerals designate similar items throughout all the figures. The following Abbreviations Table shows several abbreviations used in the drawings and in the description of the present inventive system, method and program. The term "monetization" refers to utilizing a certain feature of cell phone telecommunications and collecting money employing that cell phone feature.

In the prior art, it is known that some cell phones and some telecommunications cellular telephone carriers permit cell phones, which are connected to the telecommunications carrier wireless network, to accept charges for short message charges or SMS charges. Particularly, SMS premium charges may be permitted by both the cellular carrier and the cell phone. Sometimes, a carrier handles SMS charges but will not permit certain cell phones on its network to accept SMS premium charges. SMS technology has facilitated the development and growth of text messaging and is sometimes called herein "message service communications protocol."

The term "cellular telephone carrier" includes all types of telecommunications carriers delivering cellular or other types of wireless telephone service, either directly or through other telecommunications entities, to end-users with cellular phones or cellular service enabled devices. "Cell phones" include these cellular service enabled devices. The cellular telephone carrier may be a third party reseller of cellular phone services (a reseller of Verizon cell phone carrier services). The term "telephone number" includes numeric and alphanumeric and symbolic characters. A "cellular telephone number" also includes, in conjunction with the present invention and appended claims, either the cell phone number or any unique identifier which, by data processing methods, is linked or associated with the cellular telephone number.

| Abbreviations Table | |
| --- | --- |
| Admin | Administrator |
| ANI | Automatic number identification service or system commonly used to identify a called telephone unit |
| ASP | Application service provider - server on a network |
| API | Application programming interface |
| bd | Board |
| CCS | Cell phone connect service |
| chg | Charge, such as charge or invoice a customer for a phone call |
| ck | Check or confirm with |
| comm. | Communications, typically telecommunications |
| db | Data base |
| Disp | Display |
| doc | Document |
| equip | Equipment |
| ext | External |
| I/O | Input/output |
| IVR | Interactive voice response service, system or module |
| id | Identify |
| int | Internal |
| mem | Memory |
| msg | Message |
| OSP | Operator Service Provider, as part of a telecommunications service or system |
| sms | Short message service communications protocol |
| ph | Phone |
| pgm | Program |
| P/W | Password |
| Rcd | Record or log into data in a database or record profile |
| re | Regarding or relating to |
| rei | Release |
| req | Request |
| rev | Review |
| rpt | Report |
| sel | Select |
| Serv. | Service |
| sys | System |
| t | Time |
| telecom | Telecommunications system or network |
| URL | Uniform Resource Locator, x pointer, or other network locator |
| w/ | With |

Figure 1:
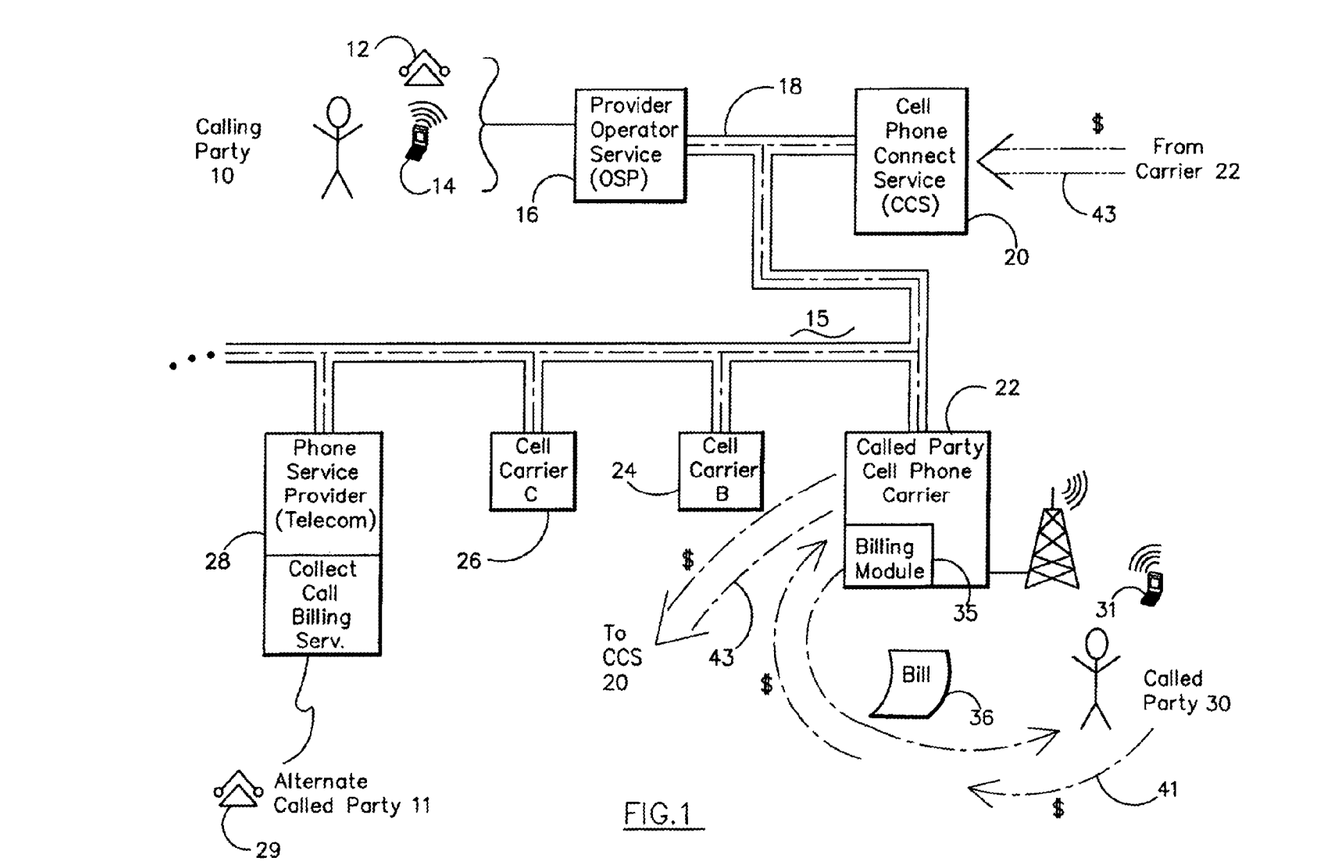
FIG. 1 is a system diagram of the telephone communications system.

FIG. 1 diagrammatically illustrates a system diagram of a telecommunications system. Calling party 10 has access to a land line 12 or a cellular telephone 14. In conjunction with the present invention, calling party 10 can only access telecommunications network 15 through an operator service provider OSP 16. The linkage or coupling or backbone of the telecommunications system 1 is graphically identified as telecommunications network 18. Network 18 may include land lines, satellites, fiber optics, the Internet (see VOIP applications) and wireless networks. Telecommunications network 18 is connected to cell phone connect service (CCS) 20, a called party cell phone carrier 22, cell phone carrier B 24, cellular carrier C 26 and phone service provider telecom 28.

The prior methodology enables calling party 10 via land line 12 to access OSP 16. The operator or automated IVR system at OSP 16 recognizes that calling party 10 wishes to access alternate called party 11 having land line 29 connected in some fashion to phone service provider 28 because caller 10 inputs the phone number of phone 29. The OSP 16 utilizes telecommunications network 18 to access phone service provider 28 which provider 28 then calls alternate called party 11. OSP 16 then inquires through phone service provider 28 whether alternate called party 11 will accept the collect call. If YES, the collect call is connected between caller party 10 and alternate called party 11. Phone service provider 28 bills the owner of telephone 29 for the collect call.

In contrast, called party 30 utilizing cell phone 31 may or may not be enabled or permitted to accept collect calls.

A reasonable number of cellular telecom carriers are unable or unwilling to bill the owner of cell phone 31 for collect calls. Sometimes in this patent description, reference is made to a "message service billing charge" which refers to charges billed to the account for cell phone 31 by cellular carrier 22. Premium SMS or message service billing charges may be $10 or higher per unit event (for example, 20 minutes of call time). Multiple message service billings or variable message service billings may be employed herein.

In contrast, a reasonable number of cellular telephones and/or cell phone carriers 22 do permit billing of SMS or message service billing charges to a particular cellular telephone account. Therefore, a determination must be made early in the "collect call" process to ascertain whether cell phone carrier 22 is enabled to accept message service billing and is enabled to charge their customers for such message service bills. Also, a determination must be made that a particular identifiable cellular telephone is enabled to accept these message service billing charges. Calling party 10 employing a telecommunications device with operator service provider 16, inputs a called cellular telephone number which may be associated with either cell phone carrier 22 or cell carrier B 24 or cell carrier C 26. Therefore, the system must ascertain what cell phone carrier is linked to the input cellular telephone number.

A diagrammatic billing cycle for the message service billing is shown by billing service computer program module 35 which sends a bill 36 (paper or electronic or charge slip to a bank or a credit card or a financial institution) to called party 30. Called party 30 then authorizes or permits withdraw of money or compensation which payment is ultimately logged or recorded by billing module 35 and cell phone carrier 22. Part of that money paid by called party 30 in the present invention is delivered to CCS 20 for compensation of the inventive system and method for collect cellular telephone calls. This process monetizes the collect cell phone call.

Figure 2:
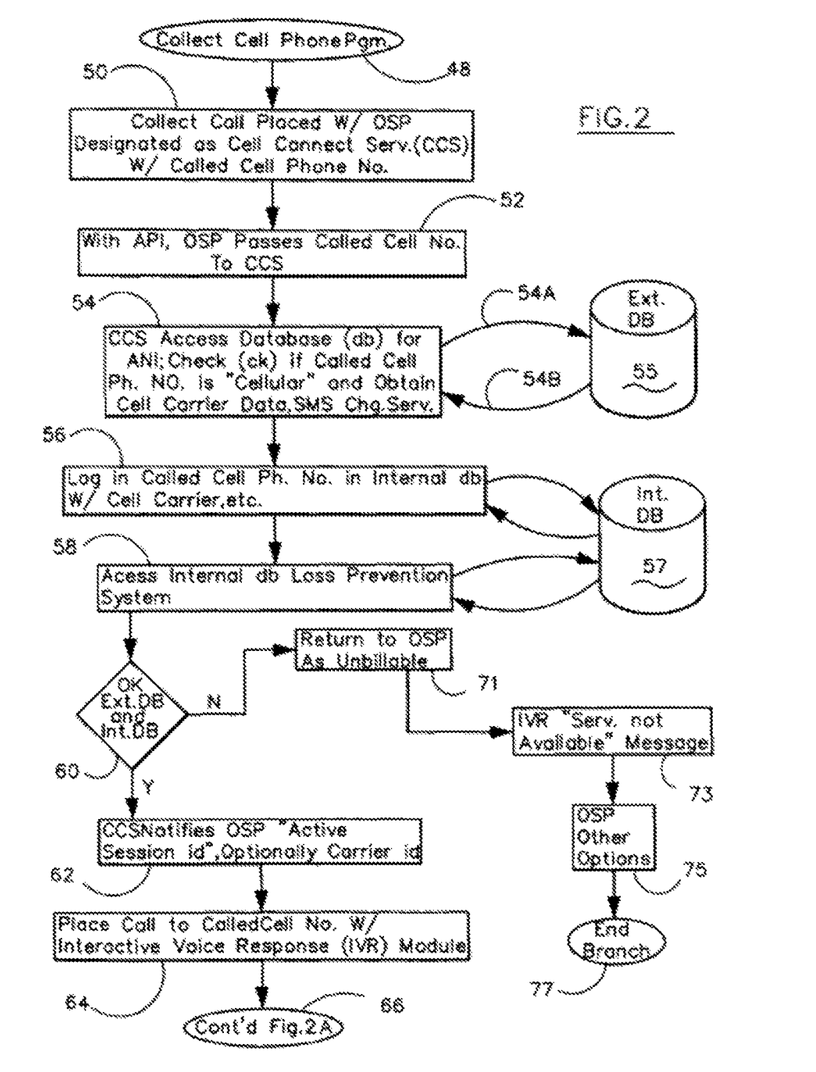
FIGS. 2, 2A and 2B diagrammatically illustrate a block-diagram flowchart showing many functional aspects and software modules for the collect cell phone program.

FIG. 2 diagrammatically illustrates functional block diagrams and cell phone program modules which may be employed in conjunction with the present inventive method and system. It should be noted that the sequence of operation of the collect cell phone program 48 in FIGS. 2, 2A and 2B may be rearranged in any sequence unless otherwise specified herein. Some modules may be combined with others or expanded to include features discussed herein. General comments regarding the system and method are found at the end of this detailed description of the preferred embodiment.

Collect cell phone program 48 begins by calling party 10 (FIG. 1) placing a cellular telephone collect call to operator service provider OSP 16. Calling party 10 inputs a cellular telephone number associated with an identifiable cellular telephone 31 (at step 50). The OSP 16 has an application programming interface (API) provided by and operating in conjunction with cell phone 7 connect service CCS 20. Effectively, OSP 16 and the hardware and software at OSP 16 either is a combination of software modules (provided by CCS 20) or communicates software and hardware at CCS 20 provided over telecommunications network 18. In any event, the OSP 16, in step 52, passes the called cell phone number to CCS 20. In step 54, CCS 20 accesses a database to determine the automatic number identification (ANI) service. The ANI service identifies which cell carrier 22, 24, 26 is associated with the input cellular telephone number. Technically, the ANI service is provided via external database 55. There may be one or many data stores or databases. The communications links 54A, 54B in FIG. 2 establish mechanisms and software access modules for returning this information ultimately to CCS 20 and to the API at OSP 16. Further, the API and/or the CCS 20 determines whether the input number from calling party 10 is an active cellular number and determines whether the cell phone carrier 22 accepts the message service billing, in the present situation, an SMS charge service.

In step 56, the called cellular telephone 31 of called party 30 is input or recorded in internal database 57 along with the cell phone carrier. The internal or designated database or data store is typically maintained by CCS 20 but may be an external database. As is known in the industry by person of ordinary skill in the art, the automatic number identification (ANI) service and external database 55 is publicly available through reasonable authorization procedures. Internal database 57 is internally run by CCS 20. Step 58 accesses the internal database 57 and activates a loss prevention system.

One example of an external database 57 is Neustar which enables an inquiring party via a data packet to determine the cell phone carrier for a particular cell phone telephone which then enables CCS 20 to determine whether that cell phone carrier will accept SMS or message service billing charges.

The loss prevention system operated on and utilizing internal database 57 at CCS 20 can be configured in many ways. The loss prevention system may include a call frequency analysis program (limiting frequent collect calls to a single phone), a white list of approved cell phone numbers, and a black list of disapproved or deny-service cell phone numbers. For example, if a collect cellular telephone call has been made and a bill 36 is sent out but then rejected or charged back by called party 30, the charge back is recorded in internal database 57 and the denied service or black list is updated to include the designated cell phone 31 which correlates to called party 30. Future calls to this denied-service number may be blocked or rejected. The frequency of calls over a predetermined period (monthly) and the total amount of calls during that period may be monitored by the internal loss prevention system and internal database 57 (the designated data store for CCS20). For example, AT&T, a cellular telephone carrier, limits premium SMS or message billings to no more than 5 calls per billing cycle. In contrast, T-Mobile, another cellular carrier, permits no more than 7 SMS or message service billings per billing cycle. The CCS loss prevention program limits collect calls within these parameters based upon carrier id and frequency of use in a set period of time.

Further, the internal database 57 and loss prevention system and software module may provide a white list or approved cell phone numbers which override other considerations. For example, if calling party 10 is in prison, and calling party 10's lawyer wishes to speak to prisoner on all occasions, the lawyer, as called party 30 and as owner and in possession of cell phone 31, may always authorize a collect cell phone call from calling party 10 to cell phone 31. This cell phone number is posted on the white list.

As a further enhancement, calling party 10 may be required to input a special code in order to confirm his or her ability to complete the collect cellular telephone call. Software modifications would then include a password cross-check.

Decision step 60 determines whether the cell phone carrier 22 is enabled to accept message service billing and whether called cellular telephone 31 is enabled to accept message service billing. If not, the NO branch from decision step 60 is taken, and, in step 71, the caller is returned to OSP 16 and a voice response or interactive voice response IVR module may indicate to calling party 10 that the collect cellular call is not available. Step 73 indicates that the IVR announces that the service is not available and a message to that effect is provided to calling party 10. Step 75 indicates that the OSP 16 may provide other options to caller party 10 such as calling land line 28 and alternate call party 11. Step 77 indicates the end of that branch of the API or software module.

Returning to decision step 60, if the YES branch is taken, in step 62 CCS 20 notifies OSP 16 that an active session ID is open. The ID is passed to OSP 16 as a signal for the "active session." Optionally, the cell phone carrier identification signal may logged by OSP 16. Step 64 activates an IVR or interactive voice response to the called party in possession of cellular telephone 31. Step 66 continues the collect cell phone program from FIG. 2 to FIG. 2A. Step 68 places a message MSG 1A which is audibly heard or visibly presented via a text message to called party cell phone 31. One type of message 1A can be as follows: "You have a call from calling party 10 name. For a one-time charge of $9.99 charged to your wireless cell phone bill, you can be connected for up to 20 minutes of talk time. You will also receive an inspirational text alert. You must be 18 years or older to accept this call. Standard text message and air time charges may apply. To accept this call, press 1 or say YES."

Figure 2A:
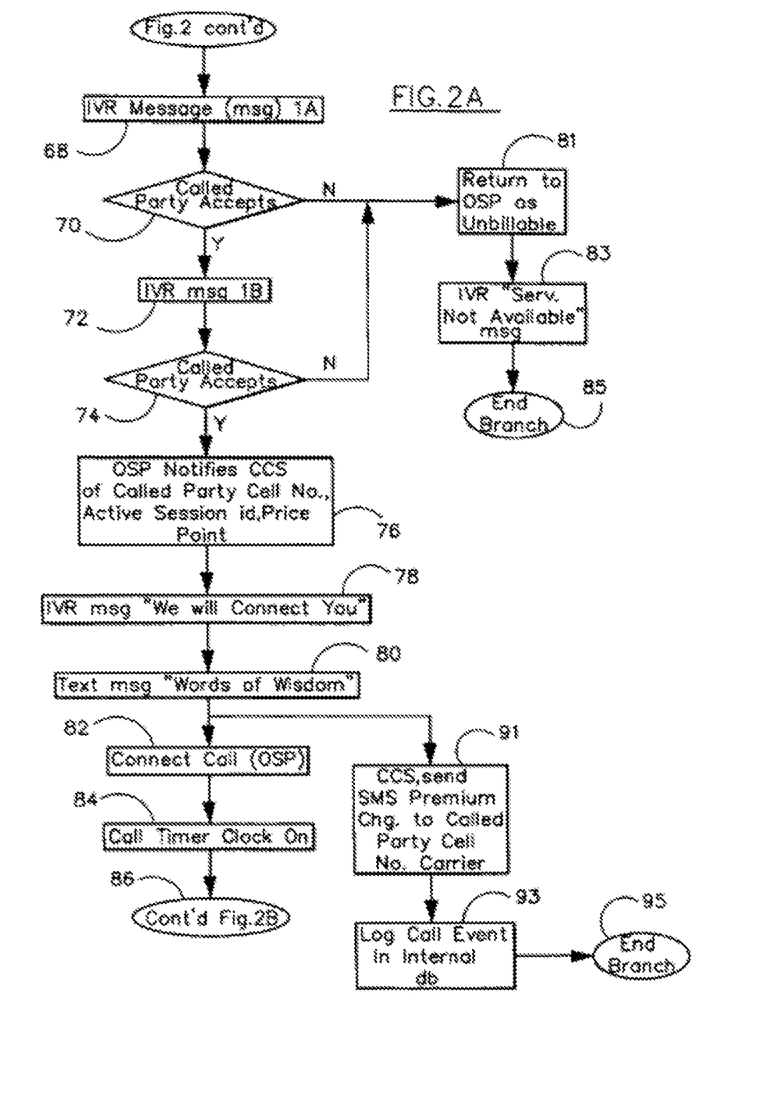

Decision step 70 determines whether called party 30 accepts or denies the call. If the called party denies the call either by saying NO, pressing a different number or taking no action (a negative opt in), the NO branch activates program module 81. A positive acceptance or a negative (no action) acceptance may be employed. Step 81 returns a signal to OSP 16 that the call in unbillable. Step 83 triggers a voice response "service not available" message to calling party 10. Step 85 notes that the branch ends.

Returning to decision step 70 if the called party possessing identified cell phone 31 indicates a positive response by pressing 1 or by saying YES, the IVR software system notes that positive response and in step 72, the IVR software module delivers second message 1B. An example of the second message may be as follows: "Thank you. By accepting this call, you are agreeing to the terms of this service which can be located at web address URL. $9.99 will be charged to your wireless phone bill and you will receive your inspirational text message shortly. To confirm these charges and be connected for up to 20 minutes of talk time, press 3."

Another example, which referred to as the negative option, may be as follows: "Thank you. By accepting the call, you are agreeing to the terms of this service which can be located at web address URL. $9.99 will be charged to your wireless phone bill and you will receive your inspirational text message shortly."

Decision step 74 determines whether the called party 30 in possession of identified cell phone 31 accepts the collect cellular telephone call. Positive or negative acceptance may be employed. If no, the system takes the NO branch which returns back to step 81 discussed above. If YES, the system activates software module 76 wherein the OSP 16 notifies the CCS 20 of the called party cellular telephone number, the active session ID and the price points for the collect call (these price points are optional). It should be noted that different prices may be assessed for different cellular telephone carriers and different calling parties 10. Therefore, different price points may be identified to OSP 16 as compared to CSS 20.

Step 78 activates the interactive voice response IVR message "we will connect you." Step 80 then delivers an inspirational text message via text message (msg). A typical inspirational text follows: "No action is more fascinating than the action of self transformation." Step 82 connects the calling party 10 through the OSP 16 and telecommunications network 18 and cell phone carrier 22 to identified cellular telephone 31. Substantially concurrently or shortly thereafter, the system in step 91 via CCS 20 generates a billing data packet or SMS premium charge linking the predetermined billing charge to the cellular telephone 31. This billing data packet (billing code, cell phone number, vendor id (CCS)) is sent effectively via telecommunications system 18 to cell phone carrier 22. In step 93, CSS 20 logs or records the call event in internal database 57. Step 95 ends the branch.

Returning to step 82 wherein the collect cellular telephone call is connected between calling party 10 and called party 30, either the OSP or the CCS establishes and initiates a timer clock in functional block 84. The activation of a timing function by the API at OSP 16 or the CCS 20 limits the duration of the collect cellular telephone call. As illustrated in FIG. 2A, jump step 86 continues the collect cell phone program on FIG. 2B. In step 88, the IVR may generate a time limit reminder to both calling party 10 and called party 30. This audio reminder may say "call will end in 2 minutes" or other predetermined call end time indicator. Step 90 shows that a "time up" has been reached on the functional timer clock. In step 92, the call is ended or disconnected by OSP 16 or CCS 20.

Figure 2B:
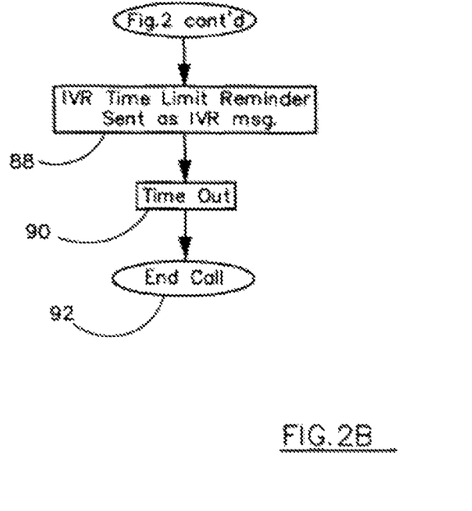

As explained above, the billing data packet or SMS premium charge is sent from CCS 20 to cell phone carrier 22. Periodically during a billing cycle, cell phone carrier 22 activates billing module 35 which generates bill 36 having the SMS charge or billing data charge. Called party 30 may pay this bill as shown by arrow 41 and ultimately a portion of this money is paid to CCS 20 as shown by arrow 43. The OSP may also be paid in a revenue sharing system. In the event called party 30 disputes the bill and refuses to pay, this event in the cellular service is called a "charge back." CCS 20 will accept charge back data from cell phone carrier 22. This charge back data is then stored in internal database 57 and the cell phone number is placed on a black list or deny-service list.

In contrast, if the cell phone and the cell phone carrier 22 excepts the billing data packet and premium SMS charge, the cell phone number and the cell phone carrier ID is placed on an approved list or white list in internal database 57. By building a denied-service or black list and an approved list of cell phone numbers and cell phone carrier IDs, the CCS 20 can quickly connect calling party 10 to called party 30 without accessing multiple databases both internal to CCS 20 and external to their operation. External databases are generally available and accessible via telecommunications network 18. The use of internal databases or data shares reduces costs of operation.

It is important to note that the CCS 20 or the API placed on both OSP 16 and CCS 20 does not actually complete the call or deny the cell phone call but simply facilitates the completion of calls and denial of service connections. The facilitation of call completion utilizes a connection data packet sent to OSP 16. The denial by CCS 20 requires generating a call denied data packet to OSP 16. In any event, the connection data packet or call denied data packet results in completion of the call by OSP 16 or the refusal to complete the collect cellular telephone call by OSP 16.

Internal database 57 may record the called cellular telephone number, the associated cell phone carrier, an indication of the predetermined billing charge, and time-based data such as date-time stamp associated with a completed call, among other things. Internal database 57 associated with CCS 20 determines the presence of an earlier record of a cell phone number and either connects the call or denies the call by generating a connection data packet or a call denied data packet.

The system utilizes software modules which are computer programs and associated memory units to identify the cellular telephone carrier, and determine whether the carrier and the cellular telephone are able to accept the message service billing charge. The resulting enablement signal is generated by CSS 20 or the API operating in conjunction with OSP 16 and CCS 20. There may be two enablement signals, one for the cell phone carrier and a second for the identified cell phone or cell phone number. The IVR generates signal representing a request for authorization which are generally identified above as messages 1A and 1B. The IVR, as is known by persons of ordinary skill in the art, includes some system or software module to determine a positive audio or electronic response from call party 30 in possession of cellular telephone 31. The facilitation of a connection between OSP 16 and cellular telephone 31 is generated by a connection signal ultimately developed by CCS 20. A system for generating the billing charge or premium predetermined billing charge is provided by computer systems, memories and programs at CCS 20.

GENERAL COMMENTS REGARDING SYSTEM AND METHOD

The present invention relates to a cell phone collect calling system and method on a telecommunications network or in a computer network (LAN or WAN) and, potentially, over the Internet and computer programs, computer modules and an information processing system to accomplish this cell phone collect calling system. In addition to the computer implementation of the inventive aspects of this invention, a computer-based method is also encompassed herein.

It is important to know that the embodiments illustrated herein and described herein below are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views.

The present invention could be produced in hardware or software, or in a combination of hardware and software, and these implementations would be known to one of ordinary skill in the art. The system, or method, according to the inventive principles as disclosed in connection with the preferred embodiment, may be produced in a networked telecommunications computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiments, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk, as would be known to one of ordinary skill in the art. Further, the program, or components or modules thereof, may be downloaded from the Internet of otherwise through a computer network.

The invention is not limited to any particular computer program or logic or language, or instruction but may be practiced with any such suitable program, logic or language, or instructions as would be known to one of ordinary skill in the art. The sequence of operation may be altered, steps or functions combined, and simplified or made more complex as necessary to carry out the functional purposes of the program step forth herein and in the claims. The functional software modules may be configured as APIs in hardware at the CCS and/or OSP as necessary to achieve the functional elements described herein. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits. Furthermore, the computer readable medium may include computer readable information in a transitory state medium such as a network link and/or a network interface, including a wired network or a wireless network, that allows a computer to read such computer readable information. The claims appended hereto are meant to cover modifications and changes within the scope and spirit of the present invention.

The invention claimed is:

1. A method of monetizing with revenue sharing a telephone communication initiated by a calling party over a telecommunications system facilitated by a service provider to a cellular telephone in use by a called party comprising the steps of:
   (a) determining whether there is authorization for a charge for message service to be billed through a service provider when a message is transmitted to the cellular telephone in use by the called party;
   (b) presenting information to the cellular telephone in use by the called party relating to the telephone communication initiated by the calling party;
   (c) allowing the called party using the cellular telephone to provide authorization to accept the charge for message service for the telephone communication from the calling party;
   (d) if there is authorization for a charge for message service to be billed for a message transmitted to the cellular telephone and if there is authorization from the cellular telephone in use by the called party to accept the charge for message service for the telephone communication from the calling party (1) facilitating connection of the telephone communication between the calling party and the cellular telephone over the telecommunications system and transmission of a message to the cellular telephone by message service and (2) initiating a charge for message service to be made to an account associated with the cellular telephone in association with transmission of the message to the cellular telephone to monetize the telephone communication;
   (e) sharing of revenue from the charge for message service for the telephone communication between the service provider facilitating connection of the telephone communication and the service provider through which the charge for message service is authorized to be billed;
   wherein revenue is generated to monetize the telephone communication by the charge for message service billed to the account associated with the cellular telephone for transmission of the message to the cellular telephone in use by the called party.

2. The method of claim 1 wherein the telephone communication is initiated by the calling party from a controlled environment facility.

3. The method of claim 1 wherein a billing charge is made to the account associated with the cellular telephone and payment of the billing charge generates revenue for revenue sharing between the service providers.

4. The method of claim 1 wherein the revenue is shared when funds are collected for message service billed for the telephone communication.

5. The method of claim 1 wherein the revenue is shared when the telephone communication is authorized.

6. The method of claim 1 wherein the message is transmitted using a message service communication protocol that facilitates a billing charge linked to the cellular telephone by at least one of (a) a service provider; (b) a carrier; (c) a connect service provider; (d) a bank; (e) a financial institution; (f) a credit card.

7. The method of claim 1 wherein the telephone communication is monetized by a card payment.

8. The method of claim 1 wherein the telephone communication is blocked by a service provider due to at least one of (a) carrier limits reached for the cellular telephone or (b) carrier deactivation of the cellular telephone.

9. The method of claim 1 wherein the telephone communication is permanently blocked by a service provider due to at least one of (a) a billing dispute or a charge back for the cellular telephone.

10. The method of claim 1 further comprising the step of identifying the service provider for telephone service associated with the telephone number of the cellular telephone.

11. The method of claim 1 wherein determining whether a charge for message service is authorized to be billed comprises determining whether an account associated with the telephone number of the cellular telephone is configured to accept a charge for a message sent to the cellular telephone.

12. The method of claim 1 wherein presenting information to the cellular telephone comprises identification of the calling party to the called party.

13. The method of claim 1 wherein transmission of the message comprises transmission, at least one of a text message, an SMS message, a premium SMS message, a short message, a text alert or a premium text message.

14. The method of claim 1 wherein the telephone communication comprises a telephone call and determining whether there is authorization for the telephone communication to the cellular telephone comprises requesting the called party to accept a charge for the call by interaction with an interactive voice response (IVR) system.

15. The method of claim 1 wherein authorization from the cellular telephone to receive the telephone communication comprises at least one of a voice input by the called party or an alphanumeric input from the cellular telephone.

16. The method of claim 1 wherein the call comprises a collect call in which a cellular telephone used by the called party is charged for the call initiated by a calling party; and
   wherein the charge for message service made to the cellular telephone monetizes the telephone communication between the calling party and the cellular telephone as a collect call.

17. The method of claim 1 wherein message service comprises text messaging service according to a message service communication protocol.

18. The method of claim 1 wherein the charge for message service is made by the service provider to the cellular telephone.

19. The method of claim 1 wherein one of the service providers is a cellular telephone carrier; and wherein monetizing the telephone communication comprises billing data being sent to the cellular telephone carrier and the charge for message service being sent to an account associated with the cellular telephone used by the called party.

20. The method of claim 1 wherein the telephone communication by the calling party is initiated through an operator service provider; and wherein a connect service provider interacts with the calling party by use of an interactive voice response system.

21. The method of claim 1 further comprising the step of facilitating denial of completion of the telephone communication if the cellular telephone used by the called party is not enabled to accept a charge for message service or if no authorization is obtained for the telephone communication.

22. The method of claim 1 further comprising the step of facilitating denial of completion of the telephone communication if no authorization is obtained from the called party using the cellular telephone.

23. The method of claim 1 wherein the telephone communication is initiated with an input of a telephone number associated with the cellular telephone used by the called party and wherein a record of the telephone communication is stored as data.

24. The method of claim 1 wherein determining whether authorization for the telephone communication has been provided comprises receipt of a positive response from the cellular telephone in use by the called party to receive the telephone communication.

25. The method of claim 1 wherein one service provider comprises a carrier and one service provider comprises a connect service provider and authorization for the charge for message service is obtained by the connect service provider; and wherein the charge for message service is billed on a per-unit basis at a predetermined billing charge using message service communication protocol.

26. The method of claim 1 wherein monetizing the telephone communication further comprises billing data being sent to the cellular telephone carrier and a charge for message service communications protocol being sent to an account associated with an identifier of the cellular telephone used by the called party.

27. The method of claim 1 wherein the charge for message service is a billing charge to monetize the telephone communication linked to an identifier of the cellular telephone.

28. The method of claim 27 wherein the cellular telephone is a mobile device and wherein the identifier is linked to at least one of (a) the telephone number associated with the cellular telephone comprising the mobile device; (b) the owner of mobile device; (c) a card to facilitate payment of the charge; (d) a credit card to facilitate payment of the charge; (e) a bank to facilitate payment of the charge; (f) the carrier to facilitate payment of the charge.

29. A system for monetizing and revenue sharing for a telephone communication facilitated by a service provider to a called party using a mobile telephone device initiated from a calling party over a telecommunications system wherein revenue for revenue sharing is generated from a charge for message service when a message is transmitted to the mobile telephone device in association with the telephone communication using message service communication protocol comprising:

a computer-based system configured (a) to determine (1) if there is authorization for a service provider to bill the charge for message service to an account associated with the mobile telephone device in use by the called party and (2) if there is authorization from the mobile telephone device in use by the called party for the telephone communication and (b) to facilitate (1) connection of the telephone communication between the calling party and called party using the mobile telephone device and (2) transmission of a message to the mobile telephone device in association with the telephone communication to the mobile telephone device with the charge for message service;

wherein the computer-based system operates with a voice response system in facilitation of the telephone communication so that at least one of the called party and the calling party interacts with the voice response system;

wherein transmission of the message to the mobile telephone device comprises transmission of a text message using message service communication protocol and the charge for message service to generate revenue for revenue sharing is billed through a service provider to an account associated with the mobile telephone device according to message service communication protocol.

30. The system of claim 29 wherein one service provider is a carrier and one service provider is a connect service provider 31. The system of claim 29 wherein the calling party interacts with the voice response system from within a controlled environment facility.

32. The system of claim 29 wherein revenue is shared between the service provider facilitating, the telephone communication and a service provider billing the charge for message service either when the revenue is collected or when the telephone communication is authorized.

33. The system of claim 29 wherein a service provider comprises at least one of a cellular telephone carrier and a connect service provider and authorization for message service communication protocol is obtained by the connect service provider for messaging under which a message service billing charge is billed on a per-unit basis at a predetermined billing charge.

34. The system of claim 30 wherein communication is permanently blocked by a service provider due to billing disputes or a charge back with the carrier.

35. The system of claim 29 further comprising data accessible to the computer-based system comprising data records relating to the telephone communication.

36. The system of claim 29 wherein the charge for message service is linked to an identifier of the cellular telephone.

37. The system of claim 36 wherein the identifier is linked to at least one of (a) the telephone number associated with the cellular telephone comprising the mobile telephone device; (b) the owner of mobile telephone device; (c) a card to facilitate payment of the charge; (d) a credit card to facilitate payment of the charge; (e) a bank to facilitate payment of the charge; (f) the carrier to facilitate payment of the charge.

38. The system of claim 29 wherein message service communication protocol facilitates a billing charge linked to the cellular telephone by at least one of (a) a service provider; (b) a carrier; (c) a connect service provider; (d) a bank; (e) a financial institution; (f) a credit card.

39. The system of claim 29 wherein the telephone communication is a call monetized by a card payment.

40. The system of claim 29 wherein monetizing the telephone communication further comprises billing data being sent to the cellular telephone carrier and the charge for message service being sent to an account associated with the mobile telephone device used by the called party.

41. A system of monetizing a telephone communication that has been initiated by a calling party over a telecommunications system to a called party using a cellular telephone having a telephone number and that is associated with a service provider comprising:
   a computer-based system in operation with a voice response system configured to determine (a) whether authorization for a charge for a message service can be billed to an account associated with the cellular telephone when a message is transmitted to the cellular telephone using message service communication protocol and (b) whether authorization for the telephone communication initiated by the calling party has been received from the cellular telephone in use by the called party; and
   data accessible to the computer-based system comprising data records relating to the telephone communication;
   wherein the voice response system is configured for interaction with the called party and/or the calling party for facilitation of the telephone communication;
   so that if there is authorization for the charge for message service to be billed for a message transmitted to the cellular telephone and if there is authorization from the cellular telephone in use by the called party for the telephone communication, the computer-based system can (a) facilitate (1) connection of the telephone communication between the calling party and the cellular telephone in use by the called party over the telecommunications system and (2) transmission of a message to the cellular telephone in use by the called party using message service communications protocol and (b) initiate a charge for message service to the account associated with the cellular telephone in association with the telephone communication for transmission of the message to the cellular telephone;
   wherein the telephone communication is monetized by the generation of revenue from the charge for message service billed to the account associated with the cellular telephone;
   wherein the cellular telephone in use by the called party comprises a mobile device linked with an identifier comprising at least one of (a) the telephone number associated with the cellular telephone; (b) an owner of the mobile device; (c) a card to facilitate payment of the charge; (d) a credit card to facilitate payment of the charge; (e) a bank to facilitate payment of the charge; (f) a cellular telephone carrier to facilitate payment of the charge.

42. The system of claim 41 wherein a service provider comprises at least one of a carrier and a connect service provider and authorization for message service communications protocol is obtained by the connect service provider for messaging under which a message service billing charge is billed on a per-unit basis at a predetermined billing charge.

43. The system of claim 42 wherein the connect service provider operates the voice response system and the interaction comprises information communicated by voice to the called party for a response by input from the called party.

44. The system of claim 41 wherein the called party interacts with the voice response system to provide authorization for the telephone communication and to be informed of the charge for message service.

45. The system of claim 41 wherein the voice response system comprises an interactive voice response (IVR) system.

46. The system of claim 41 wherein the telephone communication is initiated by a calling party in a controlled facility.

47. The system of claim 41 further comprising a revenue sharing system for revenue generated from the charge for message service billed by a service provider for the message to the cellular telephone in use by the called party.

48. The system of claim 47 wherein a service provider comprises a cellular telephone carrier.

49. The system of claim 48 wherein revenue is shared by the carrier with a service provider when revenue is collected by the carrier.

50. The system of claim 48 wherein the telephone communication attempted to the cellular telephone of the called party is blocked by a service provider when limits set by the service provider are reached or due to deactivation by the carrier.

51. The system of claim 46 wherein the controlled facility comprises at least one of a controlled environment facility, a physically restricted environment, a controlled environment, a prison and a hospital.

52. The system of claim 48 wherein the telephone communication to the cellular telephone is blocked by a service provider if the cellular telephone has at least one of a billing dispute or a charge back with the carrier.

53. The system of claim 46 wherein the communication is initiated by a user in a controlled environment facility over a land line telephone.

54. The system of claim 41 wherein data is accessible from at least one database relating to the cellular telephone of the called party.

55. The system of claim 54 wherein the database comprises billing records.

56. The system of claim 54 wherein the database comprises an approved list of telephone numbers.

57. The system of claim 54 wherein the database comprises a denied-service list of cellular telephone numbers.

58. The system of claim 48 wherein the telephone communication to the called party is blocked when a limit set by the carrier is reached or due to deactivation by the carrier.

59. The system of claim 41 wherein two determinations of authorization are required by the computer-based system prior to the connection of the telephone communication as a voice call to the called party from the calling party.

60. The system of claim 47 wherein the revenue sharing system comprises sharing revenue generated from the charge for message service billed by the cellular telephone carrier to the account associated with the cellular telephone in use by the called party between (1) the carrier and (2) the connect service provider operating the voice response system.

61. The system of claim 60 wherein revenue is shared with a service provider when revenue is collected by the carrier or when the telephone communication is authorized through the connect service provider.

62. The system of claim 41 wherein the computer-based system is configured to identify the service provider associated with the telephone number of the cellular telephone and wherein the called party has enabled the service provider to charge for message service.

63. The system of claim 62 wherein the charge for message service to generate the revenue is made by the service provider to the called party.

64. The system of claim 62 wherein the computer-based system is configured to determine whether a charge for message service can be billed by at least one of (a) determining from the service provider that the charge can be billed to an account associated with the telephone number if a message is transmitted to the cellular telephone or (b) determining from the service provider that the charge can be billed to the telephone number associated with the cellular telephone if a message is transmitted to the cellular telephone.

65. The system of claim 41 wherein the computer-based system is configured to facilitate denial of completion of the telephone communication as a voice call if the cellular telephone is not enabled to accept a charge for message service or if no authorization is obtained for the telephone communication.

66. The system of claim 41 wherein the called party comprises at least one person and wherein authorization for the telephone communication comprises indicating acceptance of a collect call from the calling party; wherein the charge for message service made to the cellular telephone monetizes the telephone communication between the calling party and the cellular telephone as a collect call; wherein monetizing the telephone communication further comprises billing data being sent to the cellular telephone carrier and the charge for message service being sent to an account associated with the cellular telephone used by the called party.

67. The system of claim 41 wherein the cellular telephone comprises a mobile device and the telecommunication system is capable of transmitting data wherein the mobile device is capable of receiving data wherein the charge for message service is for the message transmitted to the mobile device rather than for the telephone communication to the mobile device; and wherein the message comprises at least one of a text message, an SMS message, a premium SMS message, a short message, a text alert or a premium text message.

68. The system of claim 41 wherein the computer-based system is configured to facilitate connection of the telephone communication over the telecommunications system by facilitating activation of a timing function to limit a duration of the connection between the calling party and the called party.

69. The system of claim 41 wherein the telephone communication comprises a voice call on the telecommunication system to the cellular telephone and wherein facilitating connection of the telephone communication comprises establishing and continuation of the voice call by the calling party to the called party over the telecommunications system.

70. The system of claim 41 wherein monetizing the telephone communication further comprises billing data being sent to the cellular telephone carrier and a charge for message service being sent to the account associated with the cellular telephone used by the called party.

71. The system of claim 70 wherein the telephone communication is monetized by a card payment.

\* \* \* \* \*